(12) United States Patent
Yu et al.

(10) Patent No.: US 11,569,743 B2
(45) Date of Patent: Jan. 31, 2023

(54) DC-DC CONVERTER WITH PULSE MODULATION CONTROL CIRCUIT

(71) Applicant: Texas Instruments Incorporated, Dallas, TX (US)

(72) Inventors: Yangwei Yu, Hangzhou (CN); Jian Liang, Shanghai (CN); Weicheng Zhang, Shanghai (CN); Ming Luo, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 41 days.

(21) Appl. No.: 17/116,794

(22) Filed: Dec. 9, 2020

(65) Prior Publication Data

US 2021/0194367 A1    Jun. 24, 2021

Related U.S. Application Data

(60) Provisional application No. 62/946,489, filed on Dec. 11, 2019.

(51) Int. Cl.
*H02M 3/158* (2006.01)
*H02M 1/15* (2006.01)
*H02M 1/14* (2006.01)

(52) U.S. Cl.
CPC .......... *H02M 3/158* (2013.01); *H02M 1/143* (2013.01); *H02M 1/15* (2013.01)

(58) Field of Classification Search
CPC .......................................... H02M 3/155–1588
See application file for complete search history.

(56) References Cited

U.S. PATENT DOCUMENTS

| | | | |
|---|---|---|---|
| 5,355,136 A * | 10/1994 | Katagiri ................ | H02P 27/045 341/157 |
| 8,358,118 B2 | 1/2013 | Chen et al. | |
| 9,093,899 B2 | 7/2015 | Jayaraj et al. | |
| 9,337,726 B2 | 5/2016 | Lalithambika et al. | |
| 2018/0019671 A1* | 1/2018 | Li ......................... | H02M 3/156 |

OTHER PUBLICATIONS

Sengupta, Upal. "PWM and PFM operation of DC/DC converters for portable applications." In TI Power Supply Design Seminar, vol. 1700.2007. (Year: 2007).*

* cited by examiner

*Primary Examiner* — Peter M Novak
(74) *Attorney, Agent, or Firm* — Ray A. King; Frank D. Cimino (57) ABSTRACT

A DC-DC converter control circuit includes an error amplifier, a voltage-to-current conversion circuit, an oscillator circuit, and a pulse frequency modulation (PFM) control circuit. The error amplifier is configured to generate a difference voltage as a difference of an output voltage of the DC-DC converter circuit and a reference voltage. The voltage-to-current conversion circuit configured to convert the difference voltage to a difference current. The oscillator circuit is configured to generate a clock signal at a predetermined frequency for pulse width modulation. The PFM control circuit is configured to disable the oscillator circuit, based on the difference current, for PFM operation.

17 Claims, 6 Drawing Sheets

DC-DC CONVERTER WITH PULSE MODULATION CONTROL CIRCUIT

CROSS-REFERENCE TO RELATED APPLICATION

This application claims priority to U.S. Provisional Application 62/946,489 filed Dec. 11, 2019, and titled "DC/DC Converter with Robust Transition between PWM and PFM Control," which is hereby incorporated by reference in its entirety.

BACKGROUND

A DC-DC converter is an electronic circuit that converts an input direct current (DC) supply voltage into one or more DC output voltages that are higher or lower in magnitude than the input DC supply voltage. A DC-DC converter that generates an output voltage lower than the input voltage is termed a buck or step-down converter. A DC-DC converter that generates an output voltage higher than the input voltage is termed a boost or step-up converter. DC-DC converters are widely used to power electronic devices, particularly battery powered devices, such as portable cellular phones, laptop computers, and other electronic systems in which efficient use of power is desirable.

SUMMARY

In one example, a DC-DC converter circuit includes a power output, an error amplifier; a voltage-to-current conversion circuit, a pulse frequency modulation (PFM) control circuit, an oscillator circuit, a flip-flop, and a low-side transistor. The error amplifier includes an input coupled to the power output, and an error output. The voltage-to-current conversion circuit includes an input coupled to the error output of the error amplifier, and a current output. The PFM control circuit includes an input coupled to the current output of the voltage-to-current conversion circuit, and an output. The oscillator circuit includes a reset input coupled to the output of the PFM control circuit, a clock output. The flip-flop includes an input coupled to the clock output, and an output. The low-side transistor includes a control input coupled to the output of the flip-flop.

In another example, a DC-DC converter control circuit includes an error amplifier, a voltage-to-current conversion circuit, an oscillator circuit, and a PFM control circuit. The error amplifier is configured to generate a difference voltage as a difference of an output voltage of the DC-DC converter circuit and a reference voltage. The voltage-to-current conversion circuit is configured to convert the difference voltage to a difference current. The oscillator circuit is configured to generate a clock signal at a predetermined frequency for pulse width modulation. The PFM control circuit is configured to disable the oscillator circuit, based on the difference current, for PFM operation.

In a further example, a DC-DC converter circuit includes a high-side transistor, a low-side transistor, voltage divider, an error amplifier; a voltage-to-current conversion circuit, a PFM control circuit, a PWM control circuit, an oscillator circuit, and a flip-flop. The low-side transistor is coupled to the high-side transistor. The power output terminal is coupled to the high-side transistor. The voltage divider is coupled to the power output terminal. The error amplifier is coupled to the voltage divider. The voltage-to-current conversion circuit is coupled to the error amplifier. The pulse frequency modulation (PFM) control circuit is coupled to the voltage-to-current conversion circuit. The pulse width modulation (PWM) control circuit is coupled to the low-side transistor and the voltage-to-current conversion circuit. The oscillator circuit is coupled to the PFM control circuit. The flip-flop is coupled to the oscillator circuit, the PWM control circuit, the low-side transistor, and the high-side transistor.

DETAILED DESCRIPTION

In DC-DC converters used in frequency sensitive applications, accurate switching frequency is important for reducing the effects of switching noise. Fixed frequency architectures provide accurate switching frequency with pulse width modulation (PWM) control. However, with fixed frequency switching, the number of switching operations is constant, regardless of load, and the power consumed by the DC-DC converter does not change with loading. As a result, under light load conditions, switching loss in the DC-DC converter reduces efficiency.

To improve efficiency with light loading, a pulse frequency modulation (PFM) control technique may be used to extend on time or off time of a switch of a DC-DC converter. When the load decreases, the number of required switching operations decreases, and in turn reduces the switching losses. Thus, PFM operation provides high efficiency with light loading.

Figure 1:
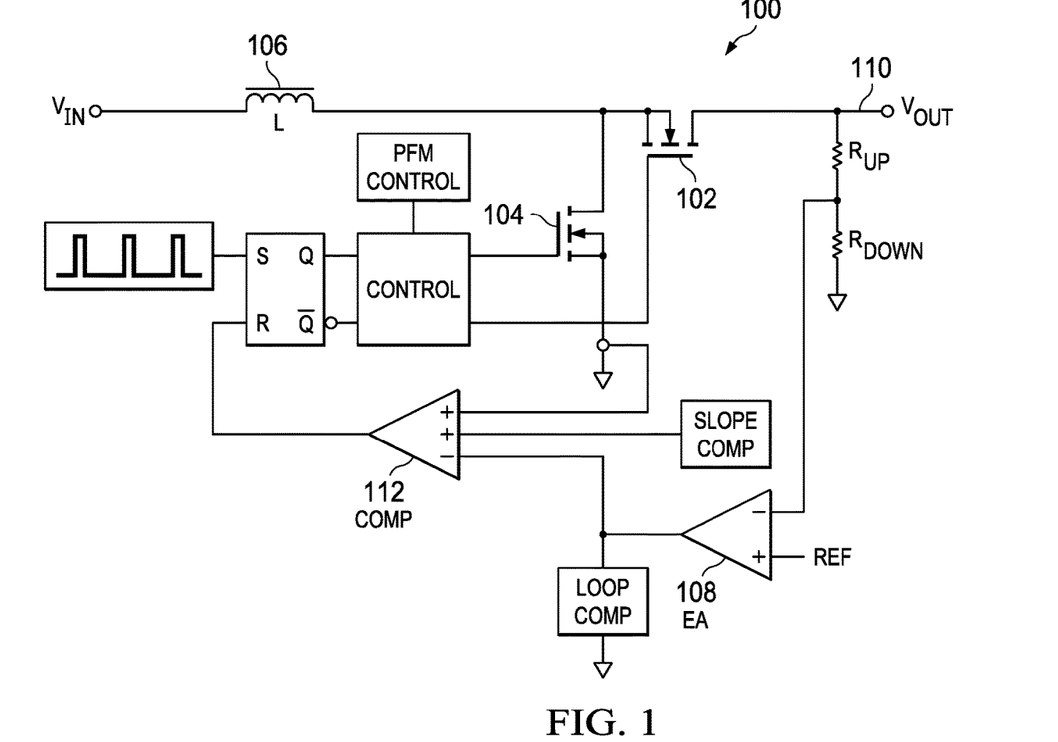
FIG. 1 is a block diagram for an example fixed-frequency based boost converter.
Figure 2:
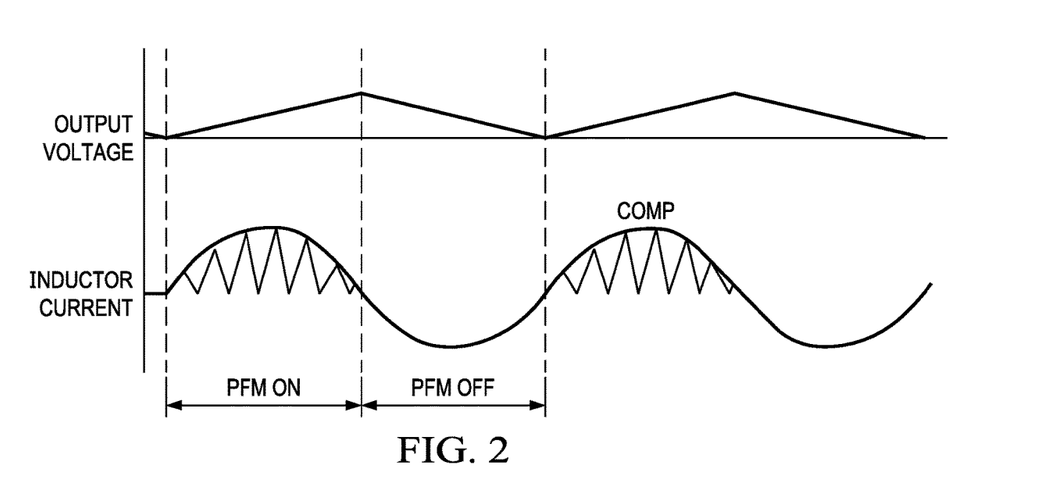
FIG. 2 shows an example of output voltage ripple for PFM operation in the boost converter of FIG. 1.

FIG. 1 is a block diagram for an example fixed-frequency based boost converter 100. The boost converter 100 includes a high-side transistor 102 and a low-side transistor 104. At the start of each switching cycle, the low-side transistor 104 is turned on until current in the inductor 106 increases to a peak value that is determined by the output of the error amplifier 108 based on feedback voltage from the power output 110. When the peak current is detected, output of the PWM comparator 112 changes state, and the low-side transistor 104 is turned off. The error amplifier 108 response time is slow, resulting in multiple pulses per PFM cycle which increases ripple in the output voltage. FIG. 2 shows an example of output voltage ripple for PFM operation with fixed frequency control in the boost converter 100.

Figure 3:
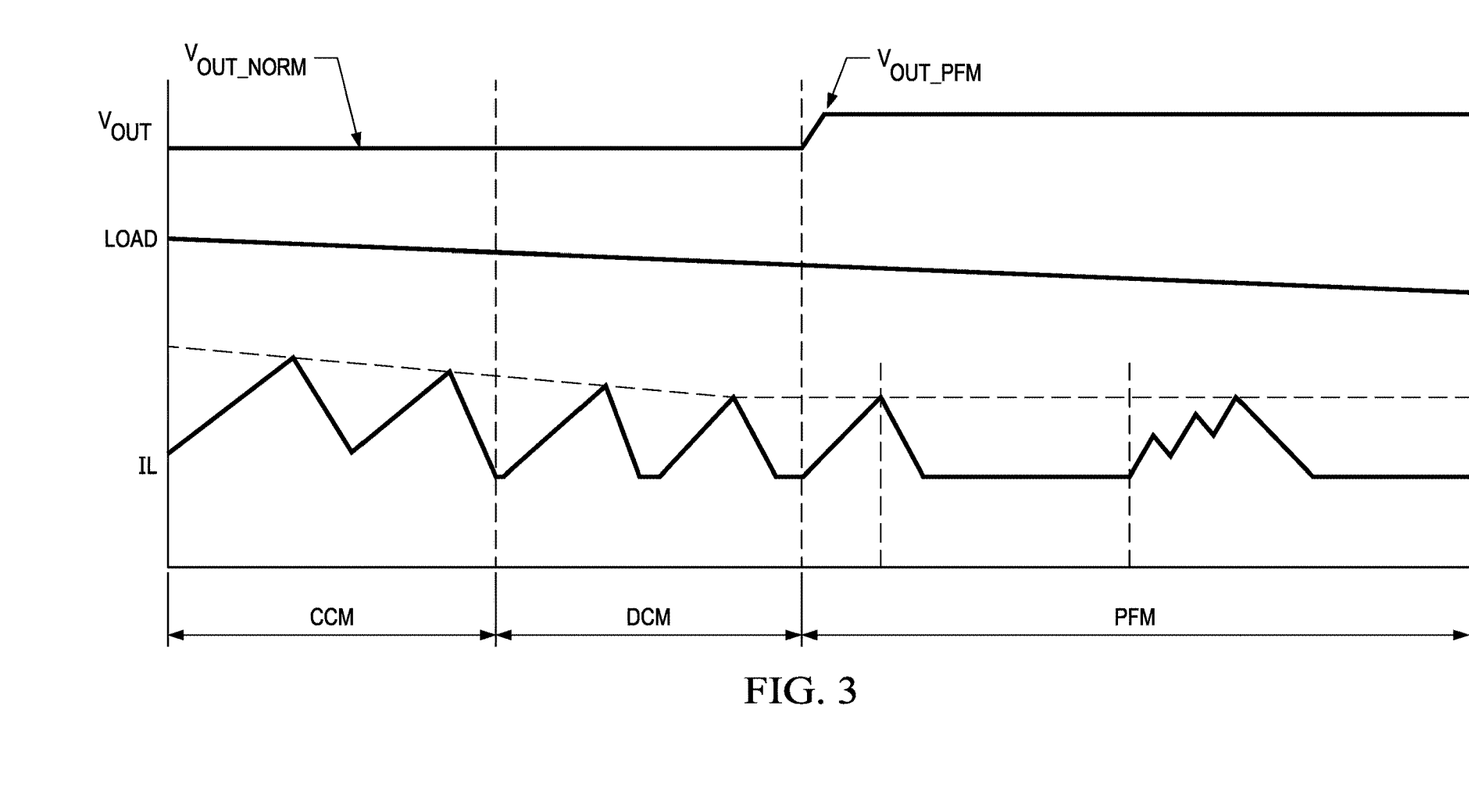
FIG. 3 illustrates PFM operation in the boost converter of FIG. 1.

FIG. 3 illustrates PFM operation in the boost converter 100. In FIG. 3, "CCM" refers to continuous conduction mode, and "DCM" refers to discontinuous conduction mode. A minimum peak current limit in the inductor 106 is set to a predetermined value (e.g., 200 milliamperes (ma)) by clamping a minimum value of output of the error amplifier 108. When the load current is lower than the minimum peak current, the output voltage of the boost converter 100 increases. If the output voltage rises a predetermined offset (e.g., 1%) above a nominal value of the output voltage, the boost converter 100 stops switching. When the output voltage of the boost converter 100 falls below a lower threshold (e.g., 0.5% above the nominal output voltage of the boost converter 100), switching is re-enabled.

PFM operation in the DC-DC converter 100 as described above is subject to various limitations: 1) a predetermined offset in the output voltage for PFM operation results in poor load regulation; and 2) skipping multiple cycles of the PWM clock when the load current is below the predetermined threshold reduces efficiency and increases output voltage ripple. Furthermore, because PFM and PWM are independently controlled, the transition between PWM and PFM may not smooth, and complex circuitry may be required to manage the transitions, which increases the circuit area of the boost converter 100. These limitations make the boost converter 100 unsuitable for use in frequency sensitive applications, such as automotive applications.

Figure 4A:
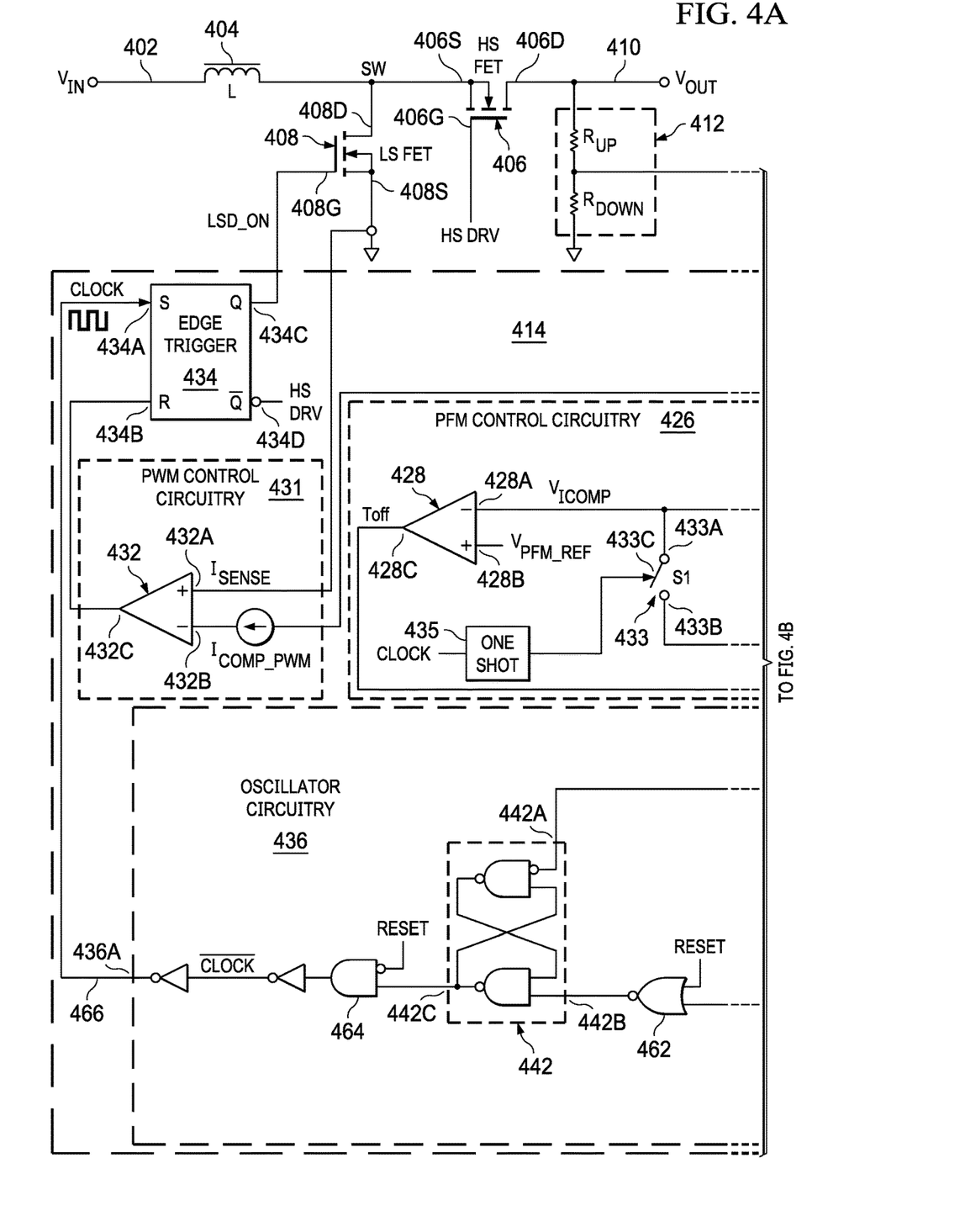
FIGS. 4A and 4B are a block diagram of a DC-DC converter circuit with adjustable off time control for PFM operation.
Figure 4B:
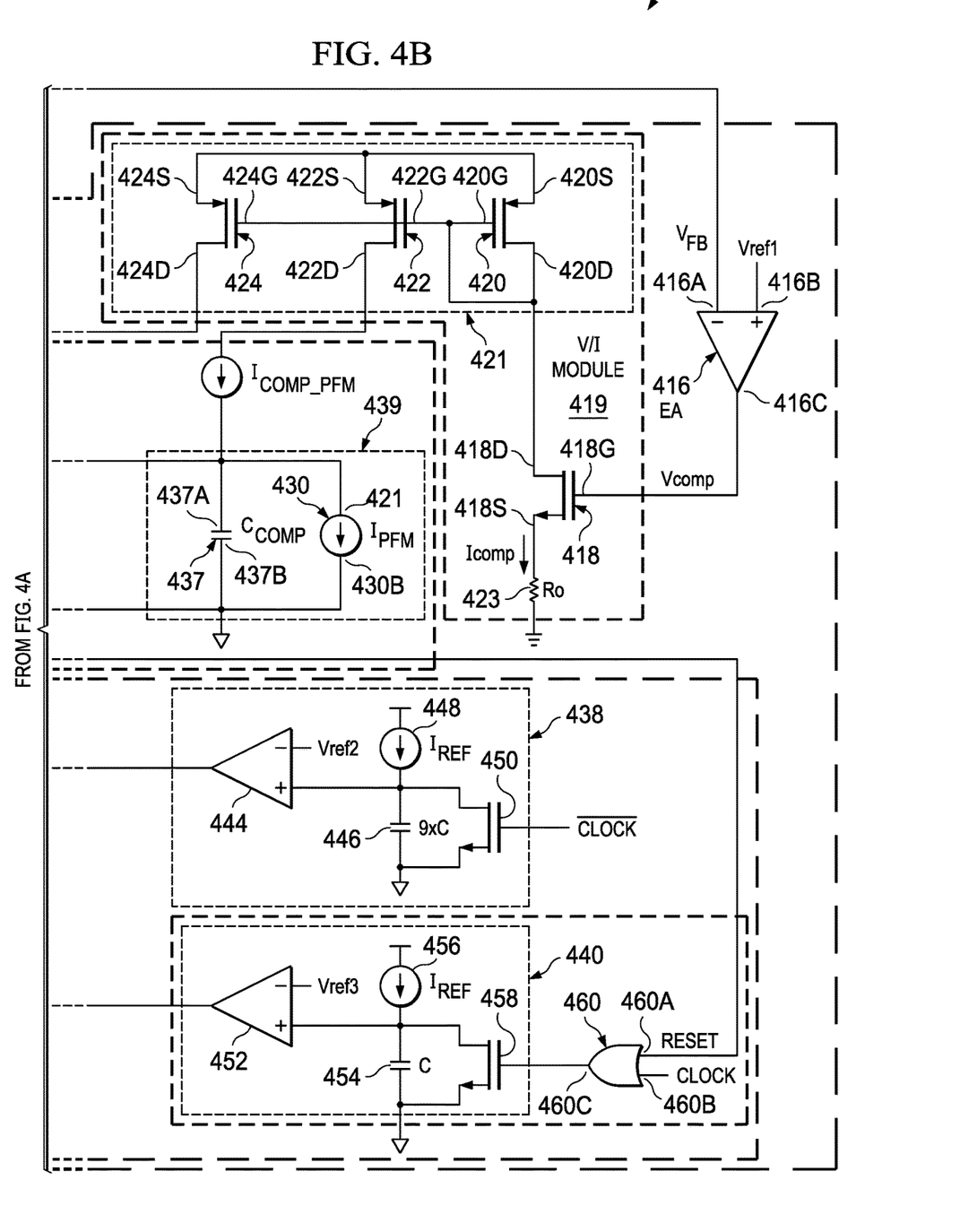

FIGS. 4A and 4B are a block diagram of a DC-DC converter circuit 400 with adjustable off time control. In the DC-DC converter circuit 400, PWM and PFM circuitry are merged to reduce circuit area and cost. The DC-DC converter circuit 400 implements PFM without using a predetermined output voltage offset, which improves output voltage regulation. PFM operation is enabled on a cycle by cycle basis which produces quick transitions between PWM and PFM operations. Output voltage ripple is reduced by extending the off time as the load is reduced.

The DC-DC converter circuit 400 includes a voltage input 402, an inductor 404, a high-side transistor 406, a low-side transistor 408, a power output 410, a voltage divider 412, and a DC-DC converter control circuit 414. Some implementations of the DC-DC converter control circuit 414 may include the low-side transistor 408, the high-side transistor 406, and/or the voltage divider 412. The high-side transistor 406 and the low-side transistor 408 are n-type or p-type field effect transistors (FETs) in some implementations of the DC-DC converter circuit 400. While FIGS. 4A and 4B illustrate the DC-DC converter circuit 400 as a boost converter, the DC-DC converter control circuit 414 may also be applied in a buck converter.

The inductor 404 is coupled to the voltage input 402 for receipt of input voltage ($V_{IN}$). The inductor 404 is also coupled to the switching node (SW). A source 406S (a current terminal) of the high-side transistor 406 and a drain 408D (a current terminal) of the low-side transistor 408 are coupled to the switching node. A drain 406D (a current terminal) of the high-side transistor 406 is coupled to the power output 410. A source 406S of the high-side transistor 406 is coupled to the switching node. A gate 406G (a control terminal) of the high-side transistor 406 and a gate 408G of the low-side transistor 408 are coupled to the DC-DC converter control circuit 414 for receipt of switching control signals. The DC-DC converter control circuit 414 turns low-side transistor 408 on and turns the high-side transistor 406 off to charge the inductor 404. The DC-DC converter control circuit 414 turns the low-side transistor 408 off and turns the high-side transistor 406 on to discharge the inductor 404. The voltage divider 412 is coupled to the power output 410 to divide the output voltage ($V_{OUT}$) of the DC-DC converter circuit 400 for comparison to a reference voltage. Thus, the feedback voltage output by the voltage divider 412 is proportional to the output voltage at the power output 410. The DC-DC converter control circuit 414 is coupled to the voltage divider 412 for receipt of the divided output voltage.

The DC-DC converter control circuit 414 includes an error amplifier 416, a current-to-voltage conversion circuit 419, a PFM control circuit 426, a PWM control circuit 431, a flip-flop 434, and an oscillator circuit 436. The error amplifier 416 is coupled to the power output 410 via the voltage divider 412, and compares the output voltage at the power output 410 divided by the voltage divider 412 to a reference voltage (Vref1) to produce a difference voltage ($V_{COMP}$) (the difference of the reference voltage and the output voltage of the voltage divider 412). In light load conditions, $V_{OUT}$ increases which results in a decrease in $V_{COMP}$. An input 416A of the error amplifier 416 is coupled to the voltage divider 412 and an input 416B of the error amplifier 416 is coupled a reference voltage source. An error output 416C of the error amplifier 416 is coupled to the current-to-voltage conversion circuit 419.

The current-to-voltage conversion circuit 419 converts the difference voltage output by the error amplifier 416 to a difference current ($I_{COMP}$). The current-to-voltage conversion circuit 419 includes a transistor 418 and a current mirror circuit 421. A gate 418G of the transistor 418 is coupled to the error output 416C of the error amplifier 416. A source 418S of the transistor 418 is coupled to ground via a resistor 423. A drain 418D of the transistor 418 is coupled to the current mirror circuit 421. The transistor 418 draws a difference current from the current mirror circuit 421 that is proportional to the difference voltage output by the error amplifier 416. The transistor 418 may be an n-type FET.

The current mirror circuit 421 includes a diode-connected transistor 420, a transistor 422, and a transistor 424. The diode-connected transistor 420, the transistor 422, and the transistor 424 may be p-type FETs. The transistor 422 and the transistor 424 mirror the current flowing to the transistor 418 through the diode-connected transistor 420 to generate replica difference currents $I_{COMP\_PFM}$ and $I_{COMP\_PWM}$. $I_{COMP\_PFM}$ and $I_{COMP\_PWM}$ may be identical to $I_{COMP}$. A drain 420D of the diode-connected transistor 420 is coupled to the drain 418D of the transistor 418, to the gate 418G of the transistor 418, to the gate 422G of the transistor 422, and to the gate 424G of the transistor 424. The source 420S of the diode-connected transistor 420 is coupled to the source 422S of the transistor 422, to the source 424S of the transistor 424, and to a power supply. The drain 422D of the transistor 422 is a first difference current output of the current-to-voltage conversion circuit 419, and the drain 424D of the transistor 424 is a second difference current output of the current-to-voltage conversion circuit 419. The drain 422D of the transistor 422 is coupled to the PFM control circuit 426, and the drain 424D of the transistor 424 is coupled to the PWM control circuit 431.

The PWM control circuit 431 includes a comparator 432 that compares the difference current ($I_{COMP\_PWM}$) to a sense current ($I_{SENSE}$) flowing in the source 408S of the low-side transistor 408. When the sense current exceeds the difference current, the output signal of the comparator 432 changes state to turn off the low-side transistor 408 and turn on the high-side transistor 406. As the difference voltage $V_{COMP}$ decreases, the difference current $I_{COMP\_PWM}$ decreases and the current in the inductor 404 decreases. The comparator 432 includes an input 432A coupled to the source 408S of the low-side transistor 408, an input 432B coupled to the 424D of the transistor 424, and an output 432C coupled to the flip-flop 434.

The flip-flop 434 turns the low-side transistor 408 on and off to charge and discharge the inductor 404 to regulate the output voltage at the power output 410. The flip-flop 434 is set by (responsive to) a clock signal generated by the oscillator circuit 436 to produce a signal (LSD_ON) to turn on the low-side transistor 408 (turn off the high-side transistor 406). The flip-flop 434 is reset by the output signal of the PWM control circuit 431 to turn off the low-side transistor 408 (turn on the high-side transistor 406). The flip-flop 434 may be a set-reset flip-flop. The flip-flop 434 includes an input 434A coupled to the oscillator circuit 436, an input 434B coupled to the output 432C of the comparator 432, an output 434C coupled to the gate 408G of the low-side transistor 408, and an output 434D coupled to the gate 406G of the high-side transistor 406. The flip-flop 434 may be edge triggered.

The oscillator circuit 436 generates the clock signal that sets the flip-flop 434 to turn on the low-side transistor 408 for use in both PWM and PFM operation. The oscillator circuit 436 generates the clock signal at a predetermined fixed frequency. The oscillator circuit 436 includes a timer circuit 438, a timer circuit 440, and a latch circuit 442. The latch circuit 442 includes a reset input 442A coupled to the timer circuit 438, a set input 442B coupled to the timer circuit 440, and an output 442C coupled to the output 436A of the oscillator circuit 436.

The timer circuit 438 sets the logic high time (logic high duration) of the clock cycle, and the timer circuit 440 sets the logic low time (logic low duration) of the clock cycle. The timer circuit 438 includes a comparator 444, a capacitor 446, a current source 448, and a transistor 450. The transistor 450 may be an n-type FET. The current source 448 provides a reference current to charge the capacitor 446. The transistor 450 is turned on when the clock signal is a logic low to discharge the capacitor 446. Thus, the timer circuit 438 is active when the clock signal is a logic high to time the logic high portion of the clock cycle. The comparator 444 compares the voltage across the capacitor 446 to a reference voltage to determine when to change the state of the clock signal to a logic low.

The timer circuit 440 includes a comparator 452, a capacitor 454, a current source 456, a transistor 458, and a logic gate 460 (e.g., an OR gate). The transistor 458 may be an n-type FET. The current source 456 provides a reference current to charge the capacitor 454. The reference current provided by the current source 456 may be the same as the reference current provided by the current source 448. The duty cycle of the clock signal when the reset signal is inactive (e.g., in PWM operation) may be determined by the relative size of the capacitor 446 and the capacitor 454. For example, the capacitance of the capacitor 446 may be nine times the capacitance of the capacitor 454 to set a 90% duty cycle. The transistor 458 is turned on when the clock signal is a logic high to discharge the capacitor 454. Thus, the timer circuit 440 is active when the clock signal is a logic low to time the logic low portion of the clock cycle. The comparator 452 compares the voltage across the capacitor 454 to a reference voltage to determine when to change the state of the clock signal to a logic high. The reference voltage provided to the comparator 452 may be the same as the reference voltage provided to the comparator 444. In some implementations of the oscillator circuit 436, the duty cycle of the clock signal may be set by using different reference currents to charge the capacitors 446 and 454, and/or using different reference voltages for comparison to the voltage across the capacitors 446 and 454.

The logic gate 460 is coupled to the transistor 458 for control of the timer circuit 440. The logic gate 460 disables the timer circuit 440 when the clock signal is a logic high or when a reset signal ($T_{OFF}$) received from the PFM control circuit 426 is active. The logic gate 460 includes an output coupled to the transistor 458, an input 460B coupled to the output 436A of the oscillator circuit 436, and an input 460A coupled to the PFM control circuit 426. The reset signal may also be applied to the logic gate 462 and the logic gate 464 to hold the clock signal in a logic low state.

The PFM control circuit 426 generates the reset signal ($T_{OFF}$) to control generation of clock cycles by the oscillator circuit 436 based on the difference current provided by the current-to-voltage conversion circuit 419. By causing the oscillator circuit 436 to extend clock cycles when the difference current is low (i.e., when the load coupled to the DC-DC converter circuit 400 is light), the oscillator circuit 436 enables and controls PFM mode operation in the DC-DC converter circuit 400. The PFM control circuit 426 includes a comparator 428, a current source 430, a capacitor 437, a switch 433, and a one-shot circuit 435. The current source 430 and the capacitor 437 form a ramp circuit 439 that generates a ramp voltage based on the difference current. The comparator 428 compares the ramp voltage across the capacitor 437 ($V_{ICOMP}$) to a PFM reference voltage ($V_{PFM\_REF}$). When the voltage across the capacitor 437 is less than the reference voltage, the reset signal generated by the comparator 428 is active to disable the timer circuit 440, causing the oscillator circuit 436 to extend one or more clock cycles. The comparator 428 includes an input 428A coupled to a terminal 437A of the capacitor 437, an input 428B coupled to a reference voltage source, and an output 428C coupled to the input 460A of the logic gate 460.

A terminal 437A of the capacitor 437 is coupled to the drain 422D of the transistor 422, the terminal 430A of the current source 430, the terminal 433A of the switch 433 and the input 428A of the comparator 428. A terminal 437B of the capacitor 437 is coupled to ground, the terminal 430B of the current source 430, and the terminal 433B of the switch 433. The current source 430 is coupled in parallel with the capacitor 437, and sets a reduced current applied to charge the capacitor 437 to be the difference of the current of the current source 430 and the difference current output by the transistor 422, which increases the regulation sensitivity of the DC-DC converter circuit 400.

The switch 433 is controlled by the one-shot circuit 435 to discharge the capacitor 437 for each cycle of the clock signal generated by the oscillator circuit 436. For example, the one-shot circuit 435 generates a pulse at each rising or falling edge of the clock signal 466, and the switch 433 is closed when the pulse is active to discharge the capacitor 437 and activate the reset signal generated at the output 426C of the PFM control circuit 426.

The time during which the reset signal ($T_{OFF}$) is active is controlled by the difference current $I_{COMP\_PFM}$ as:

$$T_{OFF} = \frac{C_{COMP} \times V_{PFM\_REF}}{I_{COMP\_PFM} - I_{PFM}} \quad (1)$$

where:
$C_{COMP}$ is the capacitance of the capacitor 437;
$V_{PFM\_REF}$ is the PFM reference voltage at the input 428B of the comparator 428; and $I_{PFM}$ is the current flowing through the current source 430.

In accordance with equation (1), in PWM operation, the reset time is less than the period of the clock signal (clock period) generated by the oscillator circuit 436. However, in light load conditions, the difference current $I_{COMP}$ decreases with an increase in output voltage $V_{OUT}$, and the time needed to charge the capacitor 437 to the reference voltage $V_{PFM\_REF}$ increases. When the reset time defined by equation (1) exceeds the period of the clock signal generated by the oscillator circuit 436 in PWM operation, then the reset signal extends the period of the clock signal (reduces the switching frequency of the DC-DC converter circuit 400) for PFM operation.

Figure 5:
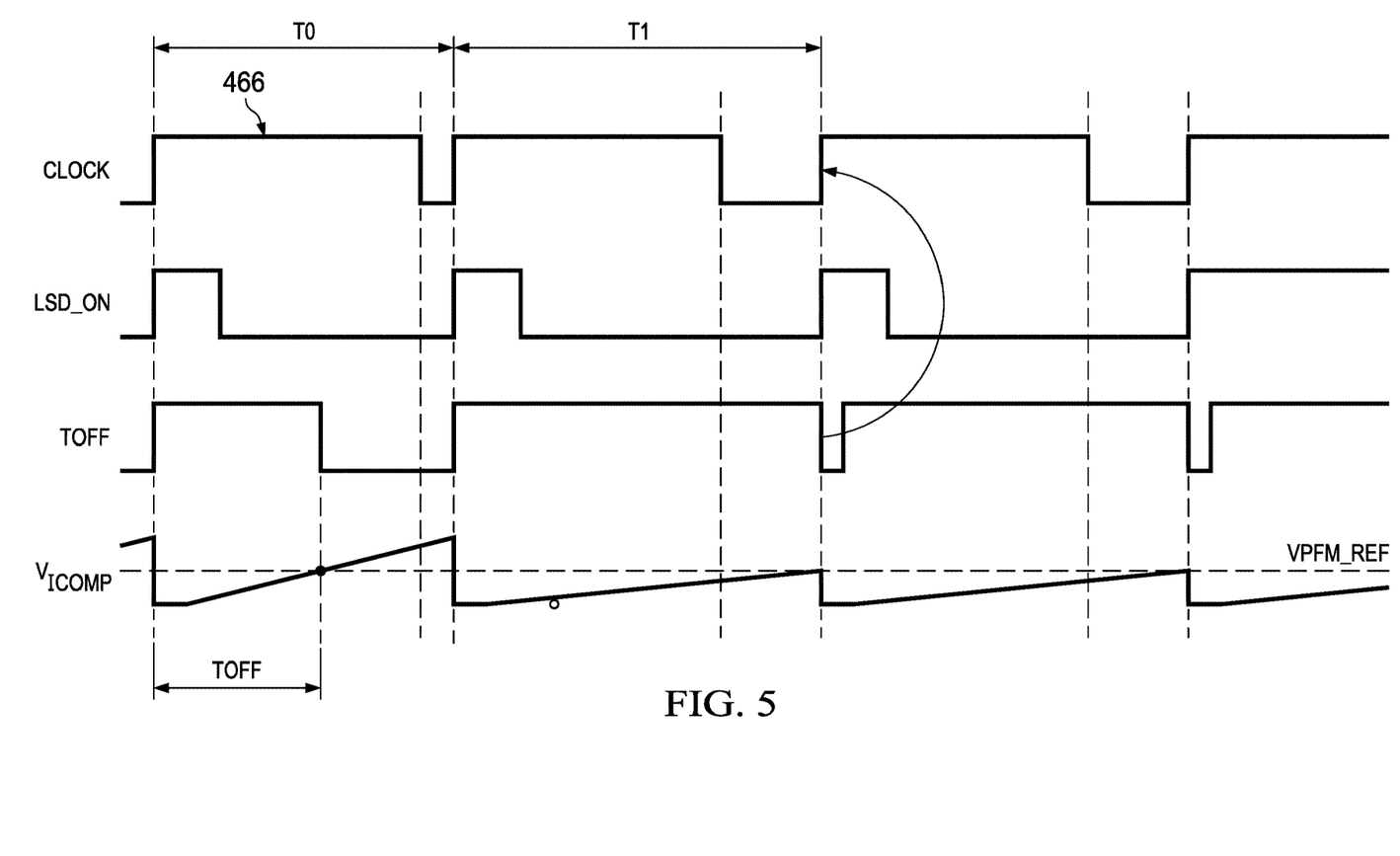
FIG. 5 illustrates an example of clock signals and low-side transistor control signals in the DC-DC converter circuit of FIGS. 4A and 4B.

FIG. 5 illustrates an example of signals in the DC-DC converter circuit 400. FIG. 5 shows the clock signal 466 generated by the oscillator circuit 436, the low-side transistor control signal LSD_ON, the reset signal $T_{OFF}$ generated by the PFM control circuit 426, the voltage $V_{ICOMP}$ across the capacitor 437, and the reference voltage $V_{PFM\_REF}$ compared to $V_{ICOMP}$. The active time of the reset signal is a function of the difference voltage $V_{COMP}$ generated by the error amplifier 416. In the interval T0, the DC-DC converter circuit 400 is operating in PWM mode. The reset signal $T_{OFF}$ is active for less than the period of the clock signal 466. The period of the clock signal 466 is determined by the timer circuit 438 and the timer circuit 440 in PWM mode. $T_{OFF}$ is deactivated when $V_{ICOMP}$ exceeds $V_{PFM\_REF}$.

In interval T1, the DC-DC converter circuit 400 is operating in PFM mode. The current charging the capacitor 437 is lower than in the interval T0, and the reset signal TOFF is active for a longer time than in the interval T0. As a result, the period of the clock signal 466 is increased by the reset signal and the switching frequency of the DC-DC converter circuit 400 is decreased.

Figure 6:
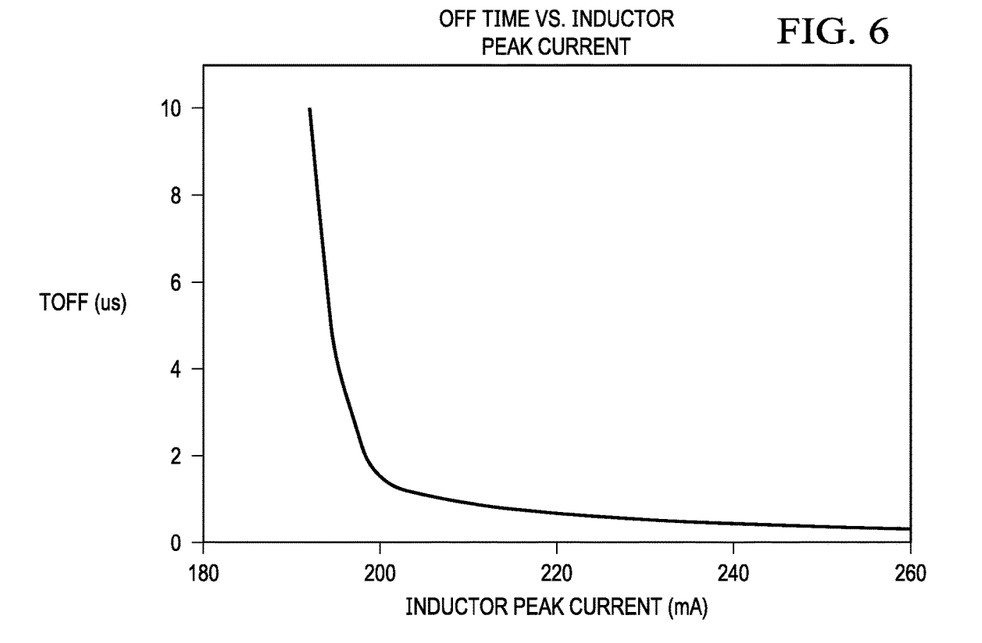
FIG. 6 is an example graph of inductor peak current versus oscillator reset time in the DC-DC converter circuit of FIGS. 4A and 4B.

FIG. 6 is an example graph of inductor peak current versus active time of the oscillator reset signal $T_{OFF}$ in the DC-DC converter circuit 400. With a peak current threshold of about 200 ma for PFM operation, the active time of the reset signal $T_{OFF}$ increases when the peak current is lower than about 200 ma. When the peak current is larger than 200 ma, the switching frequency of the DC-DC converter circuit 400 is controlled by the timer circuits 438 and 440 of the oscillator circuit 436 and is not affected by the reset signal.

Figure 7:
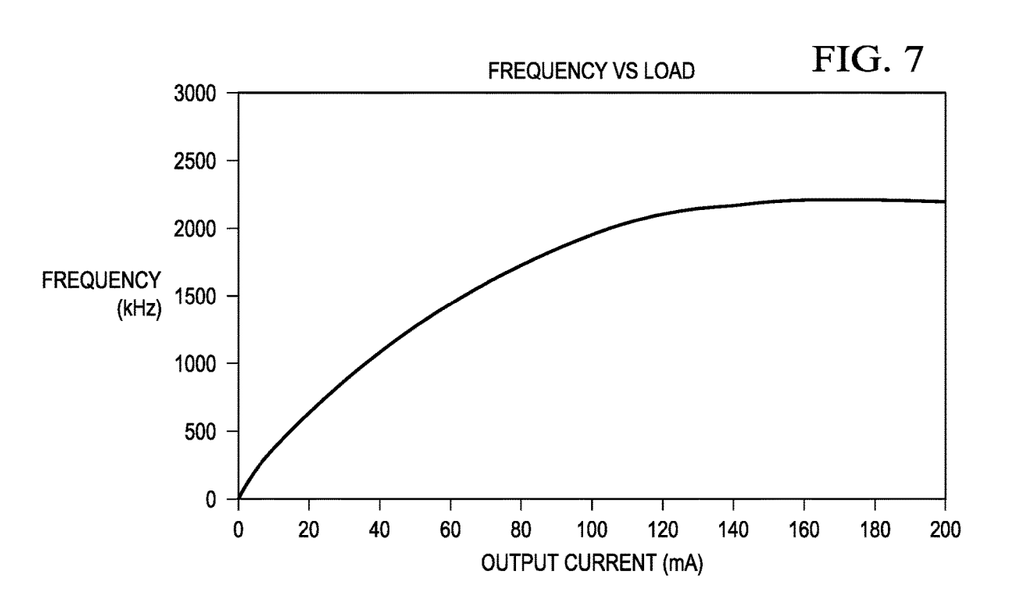
FIG. 7 is an example graph of oscillator frequency versus output current in the DC-DC converter circuit of FIGS. 4A and 4B.

FIG. 7 is an example graph of oscillator frequency versus output current in the DC-DC converter circuit 400. FIG. 7 shows that as load increases, the DC-DC converter circuit 400 operating mode changes from PFM to PWM. When operating in PWM mode, the switching frequency of the DC-DC converter circuit 400 is equal to a predetermined frequency. Various parameters of the DC-DC converter circuit 400 in FIG. 7 include: $V_{IN}$=3.3 volts; VOUT=5 volts; PWM switching frequency of 2.2 megahertz; L=0.47 micro-Henries; and output capacitance of 18 micro-Farads.

In this description, the term "couple" or "couples" may cover connections, communications, or signal paths that enable a functional relationship consistent with this description. For example, if device A generates a signal to control device B to perform an action: (a) in a first example, device A is coupled directly to device B; or (b) in a second example, device A is coupled to device B through intervening component C if intervening component C does not alter the functional relationship between device A and device B, such that device B is controlled by device A via the control signal generated by device A. Also, in this description, the recitation "based on" means "based at least in part on." Therefore, if X is based on Y, then X may be a function of Y and any number of other factors.

Modifications are possible in the described embodiments, and other embodiments are possible, within the scope of the claims.

What is claimed is:

1. A DC-DC converter circuit, comprising:
    an error amplifier having an error input and an error output, the error input coupled to a feedback terminal providing a feedback voltage proportional to a voltage at an output voltage terminal;
    a voltage-to-current conversion circuit
        having a conversion input and a current output, the conversion input coupled to the error output;
    a pulse frequency modulation (PFM) control circuit having a PFM input and a PFM output, the PFM input coupled to the current output;
    an oscillator circuit having a reset input and a clock output, the reset input coupled to the PFM output;
    a flip-flop having a flip-flop input and a flip-flop output, the flip-flop input coupled to the clock output; and
    a low-side transistor having a current terminal coupled to ground, and a control terminal coupled to the flip-flop output.

2. The DC-DC converter circuit of claim 1, wherein:
    the current output is a first current output;
    the voltage-to-current conversion circuit includes a second current output;
    the flip-flop input is a first flip-flop input;
    the flip-flop includes a second flip-flop input; and
    the DC-DC converter circuit includes:
        a comparator having first and second comparator inputs and a comparator output, the first comparator input coupled to the current terminal of the low-side transistor, the second comparator input coupled to the second current output, and the comparator output coupled to the second flip-flop input.

3. The DC-DC converter circuit of claim 2, wherein the voltage-to-current conversion circuit includes:
    a first transistor having a first control terminal coupled to the error output, a first current terminal coupled to ground, and a second current terminal; and
    a current mirror circuit including:
        a diode-connected transistor having a current terminal and a control terminal coupled to the second current terminal of the first transistor;
        a second transistor having a second control terminal coupled to the control terminal of the diode-connected transistor, and a current terminal coupled to the first current output; and
        a third transistor having a third control terminal coupled to the control terminal of the diode-connected transistor, and a current terminal coupled to the second current output.

4. The DC-DC converter circuit of claim 1, wherein the PFM control circuit includes a comparator having first and second comparator inputs and a comparator output, the first comparator input coupled to the conversion output, the second comparator input coupled to a reference voltage source, and the comparator output coupled to the reset input.

5. The DC-DC converter circuit of claim 1, wherein the PFM control circuit includes:
    a capacitor coupled between the current output and ground;
    a switch coupled in parallel with the capacitor, and having a control terminal coupled to the clock output;
    a current source coupled in parallel with the capacitor.

6. The DC-DC converter circuit of claim 1, wherein the oscillator circuit includes:

a first timer circuit;
a second timer circuit having a reset input coupled to the PFM output;
a latch circuit having first and second latch inputs and a latch output, the first latch input coupled to the first timer circuit, the second latch input coupled to the second timer circuit, and the latch output coupled to the clock input.

7. The DC-DC converter circuit of claim 1, wherein:
the flip-flop output is a first flip-flop output;
the flip-flop includes a second flip-flop output;
the DC-DC converter circuit includes:
a high-side transistor coupled between the low-side transistor and the output voltage terminal, and having a control terminal coupled to the second flip-flop output.

8. A DC-DC converter control circuit, comprising:
an error amplifier having an error input and an error output, the error amplifier configured to provide a difference voltage at the error output, the difference voltage being a difference of an output voltage of a DC-DC converter circuit and a reference voltage;
a voltage-to-current conversion circuit having a conversion input and a current output, the conversion input coupled to the error output, the voltage-to-current conversion circuit configured to convert the difference voltage to a difference current;
an oscillator circuit having a reset input and a clock output, the oscillator circuit configured to provide a clock signal at the clock output, the clock signal having a particular frequency for pulse width modulation; and
a pulse frequency modulation (PFM) control circuit having a PFM input and a PFM output, the PFM input coupled to the first current output, the PFM output coupled to the reset input, the PFM control circuit including:
a ramp circuit configured to generate a ramp voltage based on the difference current; and
a comparator configured to disable the oscillator circuit responsive to the ramp voltage being less than a PFM reference voltage.

9. The DC-DC converter control circuit of claim 8, further comprising a flip-flop configured to turn on a low-side transistor and turn off a high-side transistor responsive to the clock signal.

10. A DC-DC converter control circuit, comprising:
an error amplifier having an error input and an error output, the error amplifier configured to provide a difference voltage at the error output, the difference voltage being a difference of an output voltage of a DC-DC converter circuit and a reference voltage;
a voltage-to-current conversion circuit having a conversion input and first and second current outputs, the conversion input coupled to the error output, the voltage-to-current conversion circuit including a current mirror circuit configured to convert the difference voltage to first and second difference currents at the first and second current outputs, respectively;
an oscillator circuit having a reset input and a clock output, the oscillator circuit configured to provide a clock signal at the clock output, the clock signal having a particular frequency for pulse width modulation;
a pulse frequency modulation (PFM) control circuit having a PFM input and a PFM output, the PFM input coupled to the first current output, the PFM output coupled to the reset input, and the PFM control circuit configured to disable the oscillator circuit based on the first difference current; and
a comparator configured to provide a signal at a comparator output to turn off a low-side transistor and turn on a high-side transistor responsive to an inductor current exceeding the second difference current.

11. A DC-DC converter control circuit, comprising:
an error amplifier having an error input and an error output, the error amplifier configured to a difference voltage at the error output, the difference voltage being a difference of an output voltage of a DC-DC converter circuit and a reference voltage;
a voltage-to-current conversion circuit having a conversion input and a current output, the conversion input coupled to the error output, the voltage-to-current conversion circuit configured to convert the difference voltage to a difference current;
an oscillator circuit having a reset input and a clock output, the oscillator circuit configured to provide at the clock output a clock signal at a particular frequency for pulse width modulation, the oscillator circuit including:
a first timer configured to time a logic low portion of a clock cycle; and a second timer configured to time a logic high portion of the clock cycle; and
a pulse frequency modulation (PFM) control circuit having a PFM input and a PFM output, the PFM input coupled to the first current output, the PFM output coupled to the reset input, the PFM control circuit configured to disable the oscillator circuit responsive to the difference current, for PFM operation;
in which the oscillator circuit is configured to extend a period of the clock signal responsive to a reset signal from the PFM control circuit.

12. A DC-DC converter circuit, comprising:
a high-side transistor coupled to a power output terminal;
a low-side transistor coupled to the high-side transistor;
a voltage divider coupled between the power output terminal and ground, and having a feedback terminal;
an error amplifier having an error input and an error output, the error input coupled to the feedback terminal;
a voltage-to-current conversion circuit having a conversion input and a current output, the conversion input coupled to the error output;
a pulse frequency modulation (PFM) control circuit having a PFM input and a PFM output, the PFM input coupled to the current output;
a pulse width modulation (PWM) control circuit having first and second PWM inputs and a PWM output, the first PWM input coupled to the low-side transistor, and the second PWM input coupled to the current output;
an oscillator circuit having a reset input and a clock output, the reset input coupled to the PFM output; and
a flip-flop having first and second flip-flop inputs and first and second flip-flop outputs, the first flip-flop input coupled to the clock output, the second flip-flop input coupled to the PWM output, the first flip-flop output coupled to a control terminal of the low-side transistor, and the second flip-flop output coupled to a control terminal of the high-side transistor.

13. The DC-DC converter circuit of claim 12, wherein the current output is a first current output, and the voltage-to-current conversion circuit includes
a second current output coupled to the PWM control circuit.

14. The DC-DC converter circuit of claim 13, wherein the PWM control circuit includes a comparator coupled to the second current output, the comparator configured to compare a difference current provided at the second current output to a sense current.

15. The DC-DC converter circuit of claim 13, wherein the PFM control circuit includes:
   a capacitor coupled to the first current output;
   a switch configured to discharge the capacitor; and
   a current source coupled to an input of the comparator, and configured to set a reference current for PFM operation.

16. The DC-DC converter circuit of claim 15, wherein the PFM control circuit includes a comparator having first and second comparator inputs and a comparator output, the comparator configured to compare a voltage across the capacitor to a PFM reference voltage.

17. The DC-DC converter circuit of claim 16, wherein the oscillator circuit includes:
   a first timer circuit configured to time a logic high duration of a clock period; and
   a second timer circuit configured to time a logic low duration of the clock period;
   wherein the second timer circuit is coupled to the comparator output, the second timer circuit configured to increase the low logic duration responsive to a signal at the comparator output.

* * * * *